United States Patent Office 3,801,556
Patented Apr. 2, 1974

3,801,556
VINYL CHLORIDE BASED POLYMERS MANU-
FACTURED BY INITIATORS PREPARED
IN-SITU
Michael Langsam, Allentown, Pa., assignor to Air
Products and Chemicals, Inc., Allentown, Pa.
No Drawing. Filed June 19, 1972, Ser. No. 264,043
Int. Cl. C08f 3/30, 15/06, 15/30
U.S. Cl. 260—87.1
7 Claims

ABSTRACT OF THE DISCLOSURE

Granular vinyl chloride based polymers are manufactured in the presence of a bis-peroxysulfone free-radical catalyst, which catalyst is prepared in-situ in the presence of the monomers. The in-situ reaction can be conducted in either an acid or alkaline pH using a flexible ratio of reactants without adversely affecting product quality.

BACKGROUND OF THE INVENTION

This invention relates to a process for manufacturing commercially desirable vinyl chloride based polymers, such as vinyl chloride homopolymers (PVC) and copolymers containing vinyl chloride and other comonomers, wherein bis-peroxysulfone free-radical catalysts represented by the following formulas are prepared in-situ:

(I)
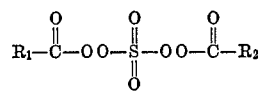

(II)
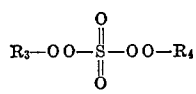

wherein $R_1$ and $R_2$ of (I) are hydrogen or lower alkyl radicals and $R_3$ and $R_4$ of (II) are hydrogen or alkali metal. Alkyl denotes radicals, such as methyl, ethyl, propyl, isopropyl, n-butyl, t-butyl, pentyl and the like. Alkali metal is inclusive of sodium potassium and lithium.

The in-site reaction is initiated and conducted in either an acid or alkaline medium with a broad, flexible ratio of sulfuryl chloride to aqueous soluble peroxide for preparing the catalyst, all without adversely affecting the quality of the resulting polymer.

Polymerization of vinyl based monomers, such as vinyl chloride may be accomplished by means of a free-radical polymerization initiator in a suspension, emulsion or bulk polymerization system. Polymerization itself is initiated by the generation of free-radicals arising from the decomposition of various peroxides, such as benzoyl peroxide, lauroyl peroxide, and the like. Bis-peroxysulfones as illustrated by Formulas I and II above, as with other peroxy catalysts, if not specially handled by storing at sufficiently low temperatures or if not metered into the reactor under carefully controlled conditions, can result in an uncontrollable rate of reaction, endangering both operators and equipment, as well as adversely affecting the polymer produced.

Processes of manufacturing vinyl chloride polymers by means of a peroxy-type free-radical catalyst prepared in-situ have been disclosed in U.S. Pats. 3,022,281 and 3,575,945. Each provides for the preparation of a dialkyl peroxy dicarbonate-type catalyst in an aqueous suspension system containing the monomer, wherein the catalyst, upon forming, then decomposes to supply the free-radicals necessary for the monomers to undergo polymerization.

The process described in 3,022,281 requires all stages of the reaction to be conducted in an alkaline medium above a pH 7. It is further recommended, an alkaline buffering agent be employed to maintain a constant alkaline pH during the entire cycle, since the in-situ reaction of the haloformate and peroxide yields acidic hydrogen halide. This process further provides for a sufficient amount of hydrogen peroxide to react with the haloformate present, which necessitates using at least a stoichiometrically equivalent amount of hydrogen peroxide, amounting to not less than 1 mole of hydrogen peroxide for each 2 moles of haloformate.

Although this earliest in-situ process did provide a solution to problems of special storage and uncontrolled reaction rate by eliminating the use of pre-manufactured peroxy catalysts, other difficulties arose making the process less than acceptable. It was found that polymers manufactured accordingly were not in the desired granular form, but instead were of a fibrous consistency. Furthermore, it was discovered that other commercially important resins, such as vinyl chloride-vinyl acetate copolymers could not be readily prepared in acceptable quality, apparently due to alkaline hydrolysis.

In attempting to remedy these drawbacks, U.S. 3,575,945 further suggests the use of excess haloformate to insure preparation of the more desirable PVC granules. However, as with the earlier process, the pH of the aqueous phase of the suspension system, at least initially, had to be carefully adjusted and maintained at above 7. Thus, in spite of the generally improved product quality, this latter process also lacked the desired flexibility, not just in terms of operable pH range, but also proportional ranges of reactants needed for in-situ preparation of the free-radical initiator itself.

It has now been discovered that high quality vinyl chloride based polymers can be prepared by means of a flexible process beginning either with an acid or alkaline pH while simultaneously using a wide ratio of reactants. The polymers are manufactured with the aid of a bis-peroxysulfone free-radical initiator, which initiator itself is prepared in-situ and has the formula:

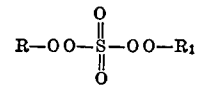

wherein R and $R_1$ are hydrogen, alkali metal or

group in which $R_2$ is hydrogen or a $C_1$ to $C_5$ alkyl radical. The initiators prepared during polymerization are generated from the reaction of sulfuryl chloride and a water soluble peroxide.

Accordingly, it is a principal object of the present invention to provide a process for manufacturing high quality, granular vinyl chloride based polymers wherein the polymerization initiator is prepared in-situ in a reaction mixture which may be either acid or alkaline.

It is a further object of the present invention to provide a flexible process allowing a wide variation of proportional amounts of reactants for preparing in-situ, bis-peroxysulfone free-radical catalysts for polymerizing vinyl chloride based monomers, all without adversely affecting product quality.

Another object of the present invention is to provide a process for manufacturing vinyl chloride based copolymers by employing a bis-peroxysulfone free-radical catalyst which catalyst itself is prepared in the reaction mixture.

A still further object of the present invention is to provide a series of novel bis-peroxysulfones, which compounds can be employed as a source of free-radicals in polymerization processes.

These and other objects, features and advantages of this invention will become apparent to those skilled in the art after a reading of the following more detailed description.

PREFERRED EMBODIMENTS OF THE INVENTION

Broadly, the invention is directed to a process for preparing vinyl chloride based polymers with the aid of a bis-peroxysulfone free-radical catalyst which may be prepared in-situ during polymerization of the monomers. The process is adaptable to polymerization systems having a water phase and a monomer phase in which each of the reactants required for preparing the catalyst is soluble in one of the two mentioned phases.

In carrying out the process, a bis-peroxysulfone catalyst is formed in the presence of the monomer(s) by reaction of a water soluble peroxide with sulfuryl chloride ($SO_2Cl_2$). The peroxide reactant is soluble in the water phase and the sulfuryl chloride is miscible in the monomer phase. Because the reaction may be readily conducted in the presence of either an acid or alkaline aqueous phase, no alkali metal hydroxides, special alkaline buffering agents, bicarbonates, acidifiers, and the like are required. The initial pH of the aqueous phase of the system will range generally from about 6 to about 8. However, most optimally, the pH will be about 7 to 8, at least initially. In this connection, it has been discovered if polymerization is initiated at this optimal range, more acceptable yields of polymer can be obtained. Because hydrogen chloride is generated during the cycle causing the pH to fall to about 2 to 3 or 4, it may be desirable to employ a buffering agent to avoid excessively low pH's.

After the initiator has been formed in the presence of the monomer, it decomposes, thus providing the free-radicals necessary to bring about polymerization of the monomers. The reaction is initiated at temperatures slightly above ordinary ambient conditions.

As previously indicated, the instant process finds widespread use in polymerization systems containing both water and oil or monomer phases wherein vinyl based monomers are polymerized in the presence of a free-radical catalyst, and more particularly, a bis-peroxysulfone free-radical catalyst. However, the method of the present invention is specially adaptable to manufacturing vinyl chloride based polymers, which for purposes of this invention, denote both homopolymers and copolymers, such as polyvinyl chloride (PVC), polyvinylidene chloride and copolymers containing vinyl chloride and other comonomers like vinyl acetate, acrylate and methacrylate esters. Usual methacrylates will ordinarily include, for example, methyl, ethyl, butyl, lauryl and stearyl and the acryates include, for example, methyl, ethyl, butyl and 2-ethyl hexyl. Included along therewith, are copolymers of vinyl chloride and various olefins, and particularly, those comprising vinyl chloride and propylene, such as the solid resins disclosed in U.S. Pat. 3,468,858. Copolymers disclosed therein are characterized as having from about 90 to 99% vinyl chloride and a propylene content of 1 to 10%, preferably 2 to 8% by weight, and an intrinsic viscosity of 0.5 to 1.5 dl./g. and a melt flow rate of at least 0.1 dg./min.

Although the disclosed processes are particularly adaptable to the preparation of the foregoing vinyl chloride based polymers, other vinyl based homo- and copolymers may also be manufactured accordingly. They include polymers of other vinyl halides, alcohols, esters and ethers, such as vinyl fluoride, vinyl alcohol, vinyl acetal, vinyl butyral, vinyl formal, vinyl laurate, vinyl myristal ether, vinyl lauryl ether and the like.

As mentioned above, bis-peroxysulfones manufactured directly in the reaction mixture (in-situ), decomposing to initiate polymerization of the vinyl based monomers, are prepared by the reaction of a water soluble peroxide with sulfuryl chloride. Aqueous soluble peroxides may include hydrogen peroxide or any of the alkali metal peroxides like sodium, potassium or lithium as well as acid peroxides having up to 4 or 5 carbon atoms e.g. ... performic acid, peracetic acid, etc. The actual requirements in selecting a suitable peroxide are not critical, however, they must nevertheless be soluble in the aqueous phase of the polymerization system.

Actual preparation of bis-peroxysulfones is accomplished by incorporating the peroxide into the aqueous phase of the reaction mixture and the sulfuryl chloride into the oil or monomer phase of the system. Sulfuryl chloride and peroxide may be added in a flexible ratio ranging from about 1:10 to about 10:1, and more preferably, at about 1:4 to about 4:1. Preferred levels of sulfuryl chloride and peroxide reactants are generally from about 0.01 to about 10.0 parts per 100 parts monomer. The reaction is initiated by elevating the temperature to a range from about 30° to about 80° C., and more preferably, from about 45° to about 65° C. The free-radical catalyst is first formed in the presence of the monomer(s) and then decomposes to supply the radicals needed to bring about polymerization of the monomers. Catalysts formed in the reaction mixture can be represented by the following formula:

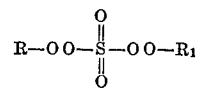

wherein the values for R and $R_1$ are the same as above, namely hydrogen, alkali metals like sodium, potassium and lithium or

group in which $R_2$ is hydrogen or a $C_1$ to $C_5$ alkyl radical. Alkyl denotes both straight and branched chained groups such as methyl, ethyl, propyl, isopropyl, n-butyl, t-butyl, pentyl and the like.

The following table illustrates but a few of the bis-peroxysulfones falling within the purview of the above formula:

TABLE

| Catalyst | R | $R_1$ |
|---|---|---|
| 1 | H | H |
| 2 | $H-\overset{O}{\underset{\|}{C}}-$ | $H-\overset{O}{\underset{\|}{C}}-$ |
| 3 | K | K |
| 4 | $CH_3-\overset{O}{\underset{\|}{C}}-$ | $CH_3-\overset{O}{\underset{\|}{C}}-$ |
| 5 | $i-C_3H_7-\overset{O}{\underset{\|}{C}}-$ | $i-C_3H_7-\overset{O}{\underset{\|}{C}}-$ |
| 6 | Na | Na |
| 7 | $C_2H_5-\overset{O}{\underset{\|}{C}}-$ | $C_2H_5-\overset{O}{\underset{\|}{C}}-$ |
| 8 | $n-C_4H_9-\overset{O}{\underset{\|}{C}}-$ | $n-C_4H_9-\overset{O}{\underset{\|}{C}}-O$ |
| 9 | $t-C_4H_9-\overset{O}{\underset{\|}{C}}-$ | $t-C_4H_9-\overset{O}{\underset{\|}{C}}-$ |

From the above table it can be seen that bis-peroxysulfones corresponding to compounds of the types of Formula I are prepared when peroxides like performic acid, peracetic acid, etc. are employed in the reaction mixture. On the other hand, bis-peroxysulfones, like those of Formula II are typically prepared whenever water soluble peroxides like hydrogen peroxide or alkali metal peroxides are used in the presence of sulfuryl chloride.

Because the in-situ preparation of bis-peroxysulfones can be carried out in either an acid or alkaline medium, the pH need not be adjusted. However, conventional buffering agents may be employed for more optimal yields of polymer. Typical examples include sodium bicarbonate, mono and dibasic sodium phosphates, McIlvanie's Standard Buffered Solutions or any conventional buffer system ordinarily prepared, for example, from a weak alkali and a salt of that alkali. Sodium bicarbonate is particularly desirable, since an initial pH of 7 to 8 provides for greater yields of polymeric material.

In preparing granular resins in a suspension system according to the present invention, protective colloids are preferably included in the aqueous phase. Any colloidal forming material can be used which would be consistent with standard practices in suspension polymerization systems. Especially preferred members would be cellulosic compounds like hydroxymethyl or hydroxyethyl cellulose. Various surfactants may also be used, such as Aerosol-OT (dioctyl sodium sulfosuccinate) as well as other non-ionic materials. These protective colloids, when used, are generally employed in an amount from about 0.01 to about 1% by weight.

The following examples illustrate some of the embodiments of this invention. It is to be understood, however, that these are for illustrative purposes only, and do not purport to be wholly definition as to conditions and scope.

EXAMPLE I

A standard water bottle tumbler was charged with the following:

| | | |
|---|---|---|
| Distilled water | gm | 200.00 |
| Sodium bicarbonate | gm | 4.0 |
| Peracetic acid | gm | 0.78 |
| Methocel (hydroxy methylcellulose) | gm | 0.072 |
| Vinyl chloride | gm | 100.00 |
| $SO_2Cl_2$ | ml | 0.81 |

The hydroxy methylcellulose was first dissolved in the water. Sodium bicarbonate and then peracetic acid were incorporated into the aqueous solution. The initial pH was 8.7. The reaction vessel was then flushed with nitrogen to remove the atmospheric air. Vinyl chloride was then introduced followed by the sulfuryl chloride. The reactor was capped and warmed to 60° C. and tumbled for 18 hours. The conversion at the end of this period was 44.0 gm. of granular polyvinyl chloride per 100 gm. of charged monomer. The final pH was 5.8.

EXAMPLE II

| | | |
|---|---|---|
| Distilled water | gm | 200.00 |
| $NaH_2PO_4$ | gm | 0.33 |
| $Na_2HPO_4$ | gm | 0.27 |
| Methocel | gm | 0.072 |
| Peracetic acid | gm | 0.78 |
| Vinyl chloride | gm | 0.78 |
| $SO_2Cl_2$ | ml | 0.81 |

The above recipe was charged into a water bath tumbler in accordance with the procedure of Example I. The initial pH was 6.60. After being tumbled for 18 to 20 hours at a temperature of 60° C. the yield of PVC granules was 21.0 gm. per 100 gm. of charged monomer. The final pH was 2.2.

EXAMPLE III

| | | |
|---|---|---|
| Distilled water | gm | 200.00 |
| $Na_2HPO_4$ | gm | 0.27 |
| $NaH_2PO_4$ | gm | 0.33 |
| Methocel | gm | 0.072 |
| $H_2O_2$ | moles | 4.8 |
| Vinyl chloride | gm | 100.00 |
| $SO_2Cl_2$ | ml | 0.4 |

The foregoing ingredients were charged into a tumbler in accordance with the method of Example I. The initial pH was 6.60. After being tumbled for 18 hours at 50° C. the final pH was 1.4 and the yield was 8.5 gm. per 100 gm. of charged monomer.

While the invention has been described in conjunction with specific examples thereof, this is illustrative only. Accordingly, many alternatives, modifications and variations will be apparent to those skilled in the art in light of the foregoing description and it is therefore intended to embrace all such alternatives, modifications and variations as to fall within the spirit and broad scope of the appended claims.

I claim:

1. A process for preparing vinyl chloride based polymers in an aqueous system which comprises forming a bis-peroxysulfone free-radical catalyst in-situ during polymerization, said catalyst having the formula:

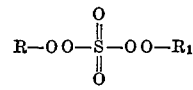

wherein R and $R_1$ are hydrogen, alkali metal or

group in which $R_2$ is hydrogen or lower alkyl, the catalyst being prepared from a water soluble peroxide and sulfuryl chloride in a ratio ranging from about 1:10 to about 10:1.

2. The process of claim 1 wherein the vinyl chloride based polymer is polyvinyl chloride.

3. The process of claim 1 wherein the vinyl chloride based polymer is a vinyl chloride-vinyl acetate copolymer.

4. The process of claim 1 wherein the vinyl chloride based polymer is a vinyl chloride-propylene copolymer.

5. The process of claim 1 wherein the water soluble peroxide is an acid peroxide having up to 5 carbon atoms.

6. The process of claim 1 wherein the water soluble peroxide is hydrogen peroxide, sodium peroxide, potassium peroxide, peracetic acid or performic acid.

7. The process of claim 1 wherein the initial pH of the reaction mixture is from about 7 to 8.

References Cited

UNITED STATES PATENTS 3,340,243 9/1967 Beer et al. _____ 260—92.8 W
3,586,722 6/1971 Sanchez et al. _____ 260—92.8 W HARRY WONG, JR., Primary Examiner U.S. Cl. X.R.

260—67 UA, 86.3, 87.5 C, 89.1, 91.1 M, 92.1 R, 92.8 W, 545 R